US006959552B2

(12) United States Patent
Leblanc

(10) Patent No.: US 6,959,552 B2
(45) Date of Patent: Nov. 1, 2005

(54) GAS TURBINE INLET FLOW STRAIGHTENER

(75) Inventor: André Leblanc, St. Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 8 days.

(21) Appl. No.: 10/802,828

(22) Filed: Mar. 18, 2004

(65) Prior Publication Data

US 2005/0204743 A1 Sep. 22, 2005

(51) Int. Cl.$^7$ ................................................ F02C 1/00
(52) U.S. Cl. ..................... 60/772; 60/269; 137/15.1
(58) Field of Search .................... 60/772, 269, 726; 137/15.1; 55/306; 415/151

(56) References Cited

U.S. PATENT DOCUMENTS

| 2,730,863 | A | * | 1/1956 | Price ........................... 60/39.15 |
| 2,864,236 | A | | 12/1958 | Touré et al. |
| 3,319,402 | A | * | 5/1967 | Ritchie ........................... 55/306 |
| 3,400,902 | A | * | 9/1968 | King ........................... 244/53 B |
| 4,154,256 | A | | 5/1979 | Miller |
| 4,641,678 | A | | 7/1984 | Matthews et al. |
| 4,611,616 | A | | 9/1986 | Pohl et al. |
| 4,743,161 | A | | 5/1988 | Fisher et al. |
| 4,930,979 | A | | 6/1990 | Fisher et al. |
| 5,557,917 | A | | 9/1996 | Jaw |
| 6,196,789 | B1 | | 3/2001 | McEwen et al. |
| 6,276,632 | B1 | | 8/2001 | Sanders et al. |
| 6,438,960 | B1 | | 8/2002 | Jaw |
| 6,519,943 | B2 | | 2/2003 | Jaw |
| 6,623,239 | B2 | | 9/2003 | Sahay et al. |
| 6,634,595 | B2 | * | 10/2003 | Koncsek et al. .......... 244/53 B |
| 6,655,632 | B1 | | 12/2003 | Gupta et al. |

FOREIGN PATENT DOCUMENTS

| CA | 2169726 | 3/1995 |
| EP | 0 356 280 | 3/1992 |
| EP | 0 407 221 | 3/1993 |
| JP | 2000 192 823 | 9/2000 |
| RU | 2180042 | 2/2002 |

* cited by examiner

Primary Examiner—Ehud Gartenberg
(74) Attorney, Agent, or Firm—Ogilvy Renault

(57) ABSTRACT

A radial inlet assembly comprising a radial inlet adapted to be in fluid communication with a compressor, and a restricting member covering the radial inlet and receiving a circumferentially asymmetric airflow, the restricting member partially blocking the airflow around the radial inlet, the restricting member blocking a greater portion of the airflow where the airflow is greater to circumferentially redistribute the airflow in a more symmetric manner in the radial inlet.

23 Claims, 4 Drawing Sheets

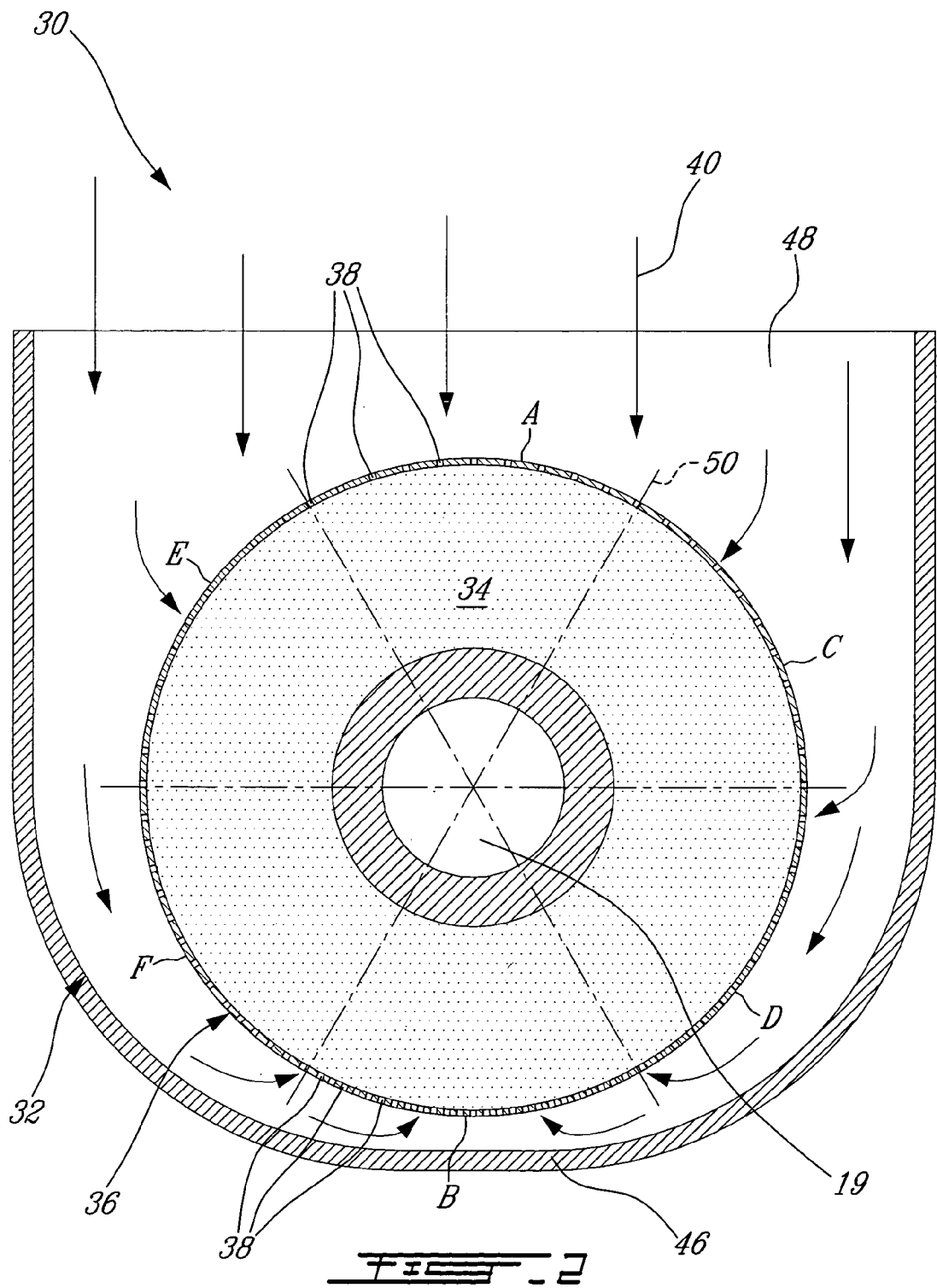

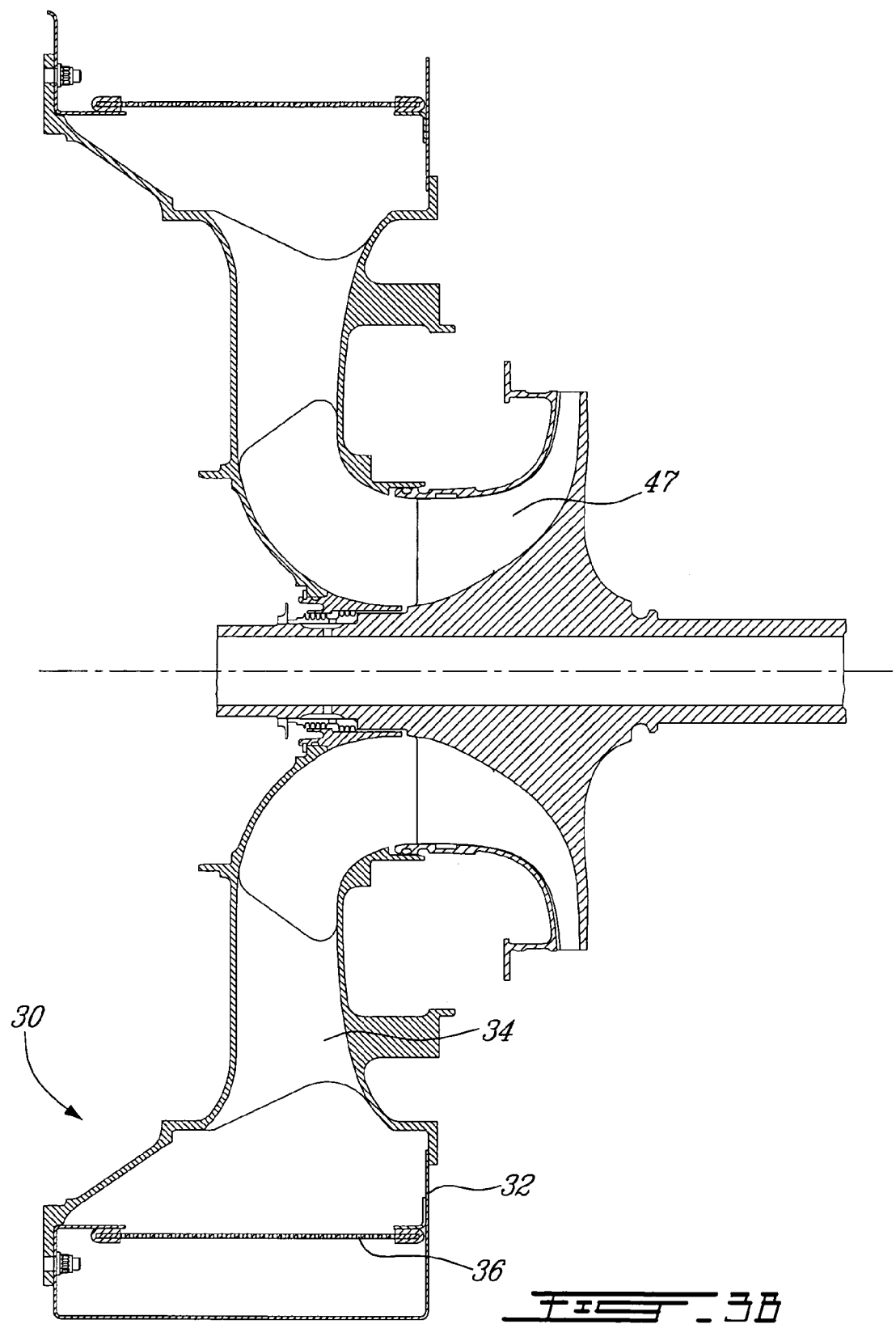

GAS TURBINE INLET FLOW STRAIGHTENER

BACKGROUND OF THE INVENTION

1. Field of the Invention

The present invention relates to gas turbine engines and, more particularly, to compressor inlets of such engines.

2. Description of the Prior Art

An uneven airflow distribution through the inlet of a compressor of a gas turbine engine can decrease the engine performance, even leading to a stall of some of the engine blades.

This problem can be even more present in radial inlets, since they are often located in a plenum which is opened to the atmosphere only along part of its circumference. Because the distance to be covered by the airflow varies about the circumference of the inlet, the airflow through radial inlets can become substantially asymmetric.

A number of devices have been developed in an attempt to obtain a more uniform airflow distribution over the inlet. Most of these devices are meant for an axial inlet. For instance, it has been proposed to add a plenum around an inlet, the plenum being separated from the inlet by an evenly perforated wall. The air pressure in the inlet is evened by varying the air pressure in the plenum through active means such as a valve. However, these means represent an additional component of the engine that can potentially fail, adds weight to the engine and requires maintenance.

Accordingly, there is a need for a simple device which can provide a more uniform airflow for a radial inlet.

SUMMARY OF THE INVENTION

It is therefore an aim of the present invention to provide an improved radial inlet assembly for a compressor.

Therefore, in accordance with a general aspect of the present invention, there is provided a radial inlet assembly for a compressor, the assembly comprising a radial inlet adapted to be in fluid communication with the compressor, and a restricting member covering the radial inlet and receiving a circumferentially asymmetric airflow, the restricting member partially blocking the airflow around the radial inlet, the restricting member blocking a greater portion of the airflow where the airflow is greater to circumferentially redistribute the airflow in a more symmetric manner around the radial inlet.

In accordance with a further general aspect of the present invention, there is provided a restricting member for straightening an airflow in a radial inlet of a compressor in a gas turbine engine, the restricting member comprising an annular body adapted to cover the radial inlet such as to partially block the airflow, the annular body being separated in a plurality of regions having a same area, extending along a length of the body and covering a same angular portion of the body, such as to define a first region, a second region diametrically opposed to the first region, and a plurality of intermediary regions extending therebetween, and a plurality of openings in the annular body, the openings in each region defining an effective opening area, the effective opening area being minimal in the first region and becoming progressively greater in adjacent intermediary regions in a symmetrical manner such as to reach a maximum in the second region.

In accordance with a still further general aspect of the present invention, there is provided a radial inlet assembly for a compressor in a gas turbine engine, the assembly comprising first means for radially providing an airflow having a first circumferentially asymmetric distribution, second means for delivering the airflow to the compressor, third means for covering the second means such as to partially block the airflow, and openings provided in the third means, an effective area of the openings varying along the third means such that a blocked portion of the airflow is greater where the airflow is greater, so that the airflow enters the second means with a second distribution which is less circumferentially asymmetric than the first distribution.

In accordance with a still further general aspect of the present invention, there is provided a compressor inlet assembly comprising a radial inlet receiving a flow of incoming air, a perforated plate covering the radial inlet, the perforated plate having a variable open area over a length thereof, the open area being greater where the flow of air is weaker.

Further yet in accordance with a general aspect of the present invention, there is provided a method for increasing the uniformity of an airflow around a radial inlet of a compressor in a gas turbine engine, the method comprising the steps of evaluating the airflow along a circumference of the radial inlet to determine at least a first region where the airflow is greater and a second region where the airflow is weaker, providing a member covering at least the first region of the radial inlet, and variably obstructing the airflow along the circumference of the inlet with the member to redistribute the airflow in a more circumferentially symmetric manner around the radial inlet.

DESCRIPTION OF THE DRAWINGS

Reference will now be made to the accompanying drawings, showing by way of illustration a preferred embodiment of the invention and in which:

FIG. 2 is a partial cross-sectional view of the radial inlet assembly, used with the gas turbine engine of FIG. 1;

FIG. 3B is a partial side view, in cross-section, of the radial inlet assembly of FIG. 2 used with a radial compressor.

DESCRIPTION OF THE PREFERRED EMBODIMENTS

Figure 1:
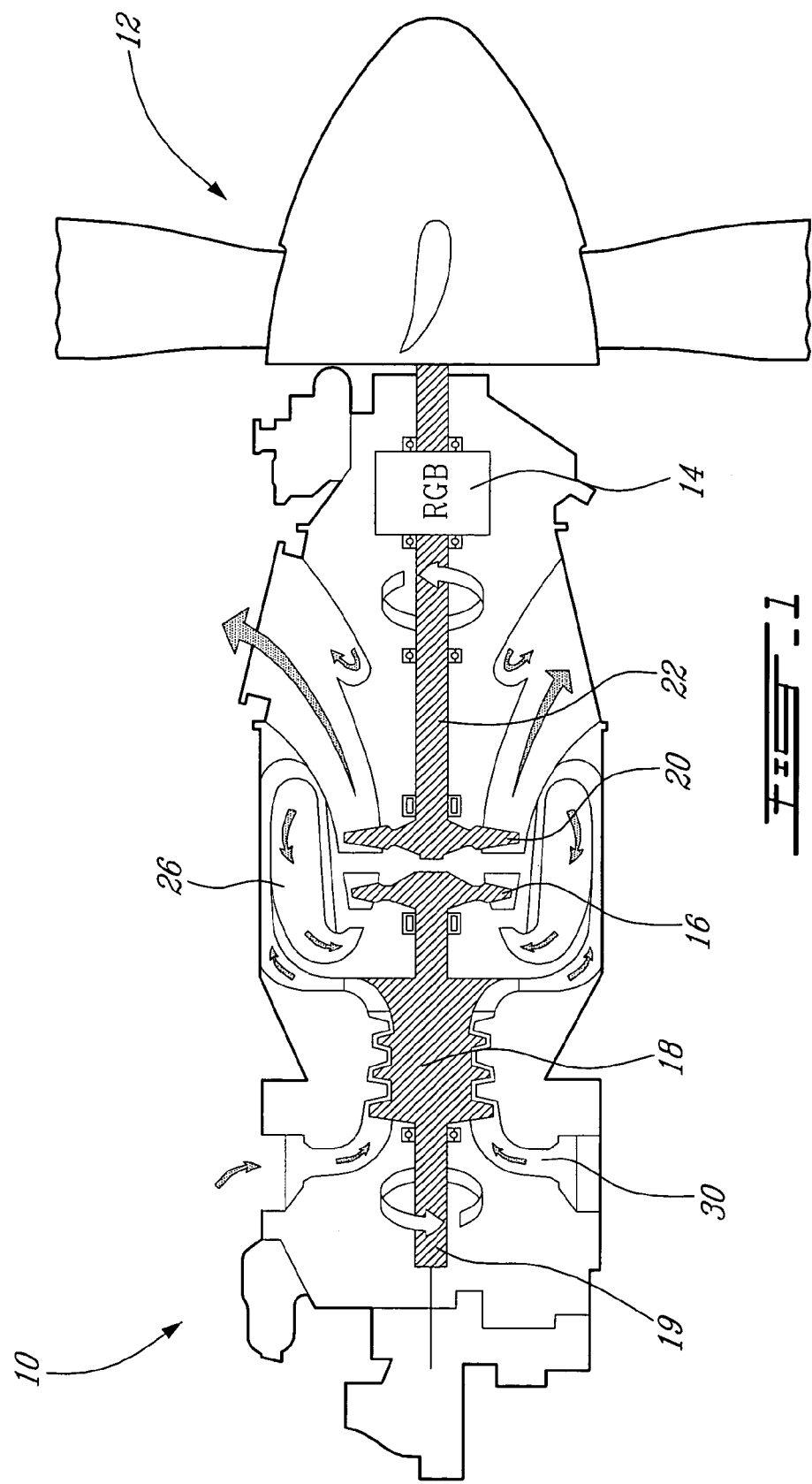
FIG. 1 is a schematic side view of a gas turbine engine, in partial cross-section, to which an embodiment of the present invention is applied.

FIG. 1 illustrates a turboprop engine 10 of a type preferably provided for use in subsonic flight to drive a propeller 12 via a reduction gear box (RGB) 14. The engine 10 comprises a first rotating assembly consisting of a turbine 16 and a compressor 18 mounted on a common shaft 19, and a second rotating assembly consisting of a power turbine 20 mounted on a power turbine shaft 22. The first and second rotating assemblies are not connected together and turns at different speed and in opposite directions. This design is referred to as a "Free Turbine Engine". It is understood that the present invention could be applied to other types of gas turbine engines as well.

The compressor 18 draws air into the engine 10, increases its pressure and delivers it to a combustor 26 where the compressed air is mixed with fuel and ignited for generating a stream of hot combustion gases. The compressor turbine 16 extracts energy from the hot expanding gases for driving the compressor 18. The hot gases leaving the compressor turbine 16 are accelerated again as they expand through the power turbine 20. The power turbine 20 provides rotational energy to drive the propeller 12. The RGB 14 reduces the power turbine 20 speed to one suitable for the propeller 12.

Figure 3A:
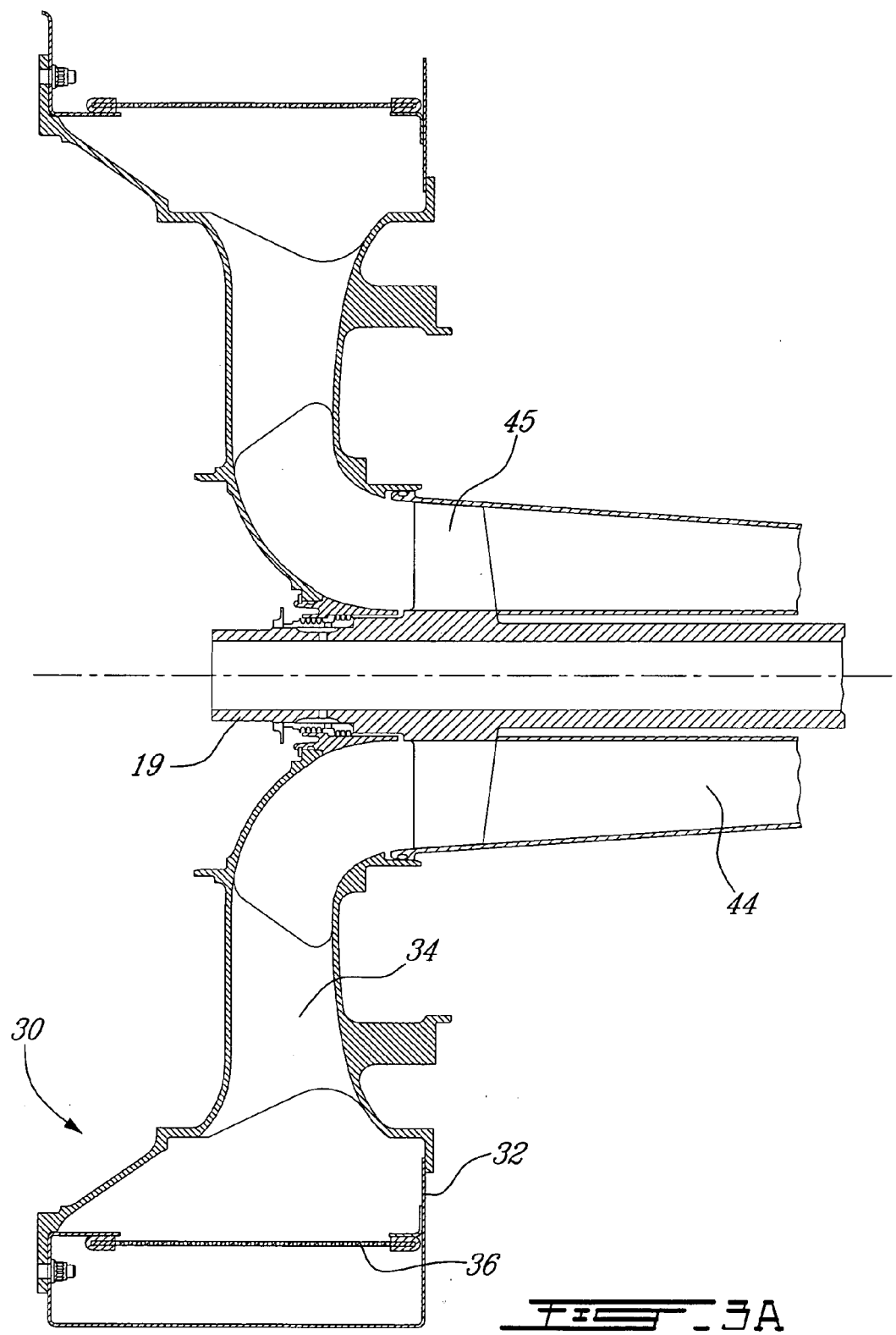
FIG. 3A is a partial side view, in cross-section, of the radial inlet assembly of FIG. 2 used with an axial compressor.

The compressor 18 receives an airflow from a radial inlet assembly indicated at 30. Referring to FIGS. 2–3A, the inlet assembly 30 comprises a plenum 32 defined by a U-shaped wall 46 having an open top end 48. The plenum 32 encloses a radial inlet 34 which is annular and disposed around the compressor shaft 19. A restricting member, provided in the form of an annular perforated plate 36, extends over the inlet 34 so as to cover it. A plurality of openings 38, which are preferably circular holes, are defined in the plate 36. The inlet 34 is connected to an axial conduit 44 (FIG. 3A) in fluid communication with an axial compressor stage 45.

The plenum 32 receives atmospheric air from the open top end 48 and thus acts as a source distributing an airflow 40 around the plate 36 surrounding the inlet 34. The plenum 32 shapes the airflow 40. Near the open top end 48, the airflow 40 hits the plate 36 directly. However, the air reaching a bottom region of the plate 36 has to travel a considerable distance and be progressively turned by the plenum wall 46. As a consequence, the airflow 40 reaching a bottom part of the perforated plate 36 is substantially attenuated. Also, the angle of the airflow 40 reaching the plate 36 is influenced by the shape of a free space between the plenum 32 and the plate 36. Generally, the airflow 40 becomes more inclined with respect to the plate 36 toward a bottom region of the plate 36.

The airflow through a hole 38 located at a specific point of the plate 36 can be evaluated by considering the portion of the airflow at the hole that is normal to the plate 36 at that point. The airflow through a specific hole 38 therefore depends on the magnitude and angle of the airflow reaching that hole, or, in other words, on the location of that hole in the plate 36. Thus, with equally distributed holes 38 all having the same surface area, the airflow reaching the inlet 34 would have a substantially asymmetrical distribution, with the airflow becoming generally progressively weaker toward a bottom end of the inlet 34.

In order to correct the airflow distribution, an effective area of the holes 38 is varied around the plate 36 so that the portion of the airflow 40 that blocked by the plate 36 is greater where that airflow is greater. The effective area is defined as the sum of the areas of the holes 38 covering a region of the plate 36. Letting a larger portion of the air reaching the plate 36 go through the holes 38 located where the airflow is weaker equilibrates the distribution of the airflow penetrating the plate 36. An adequate effective area distribution will thus provide a uniform airflow around the inlet 34.

In a preferred embodiment, the effective area is varied by varying the density of holes 38 with all holes 38 having a similar surface area. This is apparent in FIG. 2 where the plate 36 is separated in six (6) regions extending along the length of the plate 36 and defining the same angle, thus having the same area, by the broken lines 50. The region on top, labelled A, has the least number of holes 38, and the region on the bottom, labelled B, has the most number of holes 38. The number of holes 38 progressively increases in the intermediary regions C, D, E, F from the top to the bottom. One skilled in the art will of course understand that the plate 36 can be similarly separated in any number of regions, with six (6) being an exemplary embodiment. In another embodiment, it is also considered to vary the effective area by using a uniform distribution of holes 38, i.e. the same number of holes in each region, but with holes having a larger surface area where the airflow 40 is weaker. Thus, the hole size would be progressively increased toward the bottom end of the plate 36.

Although the radial inlet assembly 30 has been described as being used with an axial compressor, it can also be used with a radial compressor. Referring to FIG. 3B, the inlet 34 delivers air to a radial compressor 47 adapted to redirect air from an axial direction to a radial direction. The function and components of the inlet assembly 30 in this case are the same as previously described.

The openings 38 have been illustrated as being circular holes, but other shapes could be used, including, but not limited to, slots, oblong holes and rectangular openings. Holes of various shapes could be used in various regions of the plate 36. The plate 36 can be formed of a series of strips defining elongated spaces therebetween that act as the openings 38. The plate 36 can also be used with other types of asymmetrically shaped inlets, and with other types of air devices requiring a more symmetric redistribution of an airflow.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

What is claimed is:

1. A radial inlet assembly for a compressor, the assembly comprising:
    a radial inlet adapted to be in fluid communication with the compressor; and
    a restricting member covering the radial inlet and receiving a circumferentially asymmetric airflow, the restricting member partially blocking the airflow around the radial inlet, the restricting member blocking a greater portion of the airflow where the airflow is greater to circumferentially redistribute the airflow in a more symmetric manner around the radial inlet.

2. A radial inlet assembly as defined in claim 1, wherein the restricting member includes a plurality of openings, an effective area of the openings varying so as to be smaller where the blocked portion of the airflow is greater.

3. A radial inlet assembly as defined in claim 2, wherein the openings are circular holes.

4. A radial inlet assembly as defined in claim 1, wherein the radial inlet and the restricting member are annular.

5. A radial inlet assembly as defined in claim 1, wherein the airflow is provided through a plenum which partially surrounds the restricting member and has one open end in fluid communication with the atmosphere.

6. A radial inlet assembly as defined in claim 2, wherein the plurality of openings are equally distributed on the restricting member, and the effective area is varied by having openings of various areas.

7. A radial inlet assembly as defined in claim 2, wherein the plurality of openings have a same area, and the effective area is varied by varying a density of a distribution of the openings.

8. A radial inlet assembly as defined in claim 1, wherein the airflow reaching the radial inlet is circumferentially symmetric.

9. A radial inlet assembly as defined in claim 1, wherein the restricting member is a plate having a variable effective open area.

10. A restricting member for straightening an airflow in a radial inlet of a compressor in a gas turbine engine, the restricting member comprising:

an annular body adapted to cover the radial inlet such as to partially block the airflow, the annular body being separated in a plurality of regions having a same area, extending along a length of the body and covering a same angular portion of the body, such as to define a first region, a second region diametrically opposed to the first region, and a plurality of intermediary regions extending therebetween; and a plurality of openings in the annular body, the openings in each region defining an effective opening area, the effective opening area being minimal in the first region and becoming progressively greater in adjacent intermediary regions in a symmetrical manner such as to reach a maximum in the second region.

11. A restricting member as defined in claim 10, wherein each region as the same number of openings, and the effective opening area is varied by having openings of different sizes in adjacent regions.

12. A restricting member as defined in claim 10, wherein the plurality of openings have a same size, and the effective opening area is varied by having a different number of openings in adjacent regions.

13. A radial inlet assembly for a compressor in a gas turbine engine, the assembly comprising:

first means for radially providing an airflow having a first circumferentially asymmetric distribution;

second means for delivering the airflow to the compressor;

third means for covering the second means such as to partially block the airflow; and openings provided in the third means, an effective area of the openings varying along the third means such that a blocked portion of the airflow is greater where the airflow is greater, so that the airflow enters the second means with a second distribution which is less circumferentially asymmetric than the first distribution.

14. A radial inlet assembly as defined in claim 13, wherein the openings are equally distributed along the third means, and the effective area is varied by having openings of various sizes.

15. A radial inlet assembly as defined in claim 13, wherein the openings have a same area, and the effective area is varied by varying a density of openings along the third means.

16. A radial inlet assembly as defined in claim 13, wherein the third means comprise an annular perforated plate with variable open area.

17. A compressor inlet assembly comprising a radial inlet receiving a flow of incoming air, a perforated plate covering the radial inlet, the perforated plate having a variable open area over a length thereof, the open area being greater where the flow of air is weaker.

18. A compressor inlet assembly as defined in claim 17, wherein the perforated plate separates the radial inlet from a surrounding plenum.

19. A compressor inlet assembly as defined in claim 18, wherein the plenum is U-shaped, and wherein the perforated plate is annular.

20. A compressor inlet assembly as defined in claim 19, wherein the open area increases in a direction away from an open end of the plenum to reach a maximum at a location adjacent to a closed end of the plenum.

21. A compressor inlet assembly as defined in claim 17, wherein the perforated plate defines a plurality of holes, and wherein the open area is varied along the plate by varying at least one of the size and a density distribution of the holes.

22. A method for increasing the uniformity of an airflow around a radial inlet of a compressor in a gas turbine engine, the method comprising the steps of:

a) evaluating the airflow along a circumference of the radial inlet to determine at least a first region where the airflow is greater and a second region where the airflow is weaker;

b) providing a member covering at least the first region of the radial inlet; and c) variably obstructing the airflow along the circumference of the inlet with the member to redistribute the airflow in a more circumferentially symmetric manner around the radial inlet.

23. A method as defined in claim 22, wherein step a) further includes evaluating the airflow along a circumference of the radial inlet to determine a plurality of intermediary regions where the airflow is greater than in the second region and weaker than in the first region, the airflow in adjacent intermediary regions being different, and wherein in step b) the member covers at least the first region and the plurality of intermediary regions of the radial inlet.

* * * * *